US007757012B2

(12) United States Patent
Zilavy (10) Patent No.: US 7,757,012 B2
(45) Date of Patent: Jul. 13, 2010

(54) CONFIGURABLE MAPPING OF DEVICES TO BUS FUNCTIONS

(75) Inventor: Daniel V. Zilavy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 434 days.

(21) Appl. No.: 11/347,499

(22) Filed: Feb. 3, 2006

(65) Prior Publication Data

US 2006/0161692 A1   Jul. 20, 2006

Related U.S. Application Data

(62) Division of application No. 10/644,291, filed on Aug. 20, 2003, now Pat. No. 7,003,591.

(51) Int. Cl.
*G06F 3/00* (2006.01)
*G06F 13/00* (2006.01)
*G06F 13/36* (2006.01)

(52) U.S. Cl. ............................ 710/10; 710/8; 710/300; 710/104; 710/313; 710/314

(58) Field of Classification Search ............. 710/8, 710/104, 300, 313, 314
See application file for complete search history.

(56) References Cited

U.S. PATENT DOCUMENTS

| 5,812,820 | A | 9/1998 | Loram |
| 5,832,238 | A | 11/1998 | Helms |
| 6,023,736 | A | 2/2000 | Lambeth et al. |
| 6,108,733 | A | 8/2000 | Porterfield |
| 6,272,576 | B1 | 8/2001 | Porterfield |
| 2001/0029561 | A1 | 10/2001 | Porterfield |
| 2002/0087745 | A1 | 7/2002 | Chen |
| 2002/0133651 | A1 | 9/2002 | Wang et al. |

(Continued)

FOREIGN PATENT DOCUMENTS

JP    03-022160    1/1991

(Continued)

OTHER PUBLICATIONS

PCI Local Bus, Revision 2.3, Chapter 6 Configuration Space, pp. 193-225, 32 Pgs:, http://www.ece.mtu.edu/faculty/btdavis/courses/mtu_ee3173_f04/papers/PCI_22.pdf.

(Continued)

*Primary Examiner*—Alford W Kindred
*Assistant Examiner*—David E Martinez (57) ABSTRACT

Techniques are disclosed for enabling a single computer system to execute both operating systems that permit multiple devices to be mapped to a single PCI function and operating systems that do not permit such mapping. Prior to loading and executing an operating system (e.g., during system reset), the computer system determines whether the operating system supports mapping of multiple devices to a single function. If such mapping is supported, the computer system maps multiple devices on a single PCI card to a single function in the PCI configuration space for the card. If such mapping is not supported, the computer system maps each device to a separate PCI function. The computer system then loads and executes the operating system. The operating system is thereby enabled to access all devices on the bus according to the particular device-function mapping scheme supported by the operating system.

13 Claims, 8 Drawing Sheets

U.S. PATENT DOCUMENTS

2004/0199700 A1* 10/2004 Clayton .................. 710/305

FOREIGN PATENT DOCUMENTS

| JP | 08-161250 | 6/1996 |
|---|---|---|
| JP | 09-237246 | 9/1997 |
| WO | 97/10549 | 3/1997 |
| WO | WO 99/59074 | 11/1999 |

OTHER PUBLICATIONS

Hewlett-Packard Development Company, L.P., Notice of Rejection dated Nov. 27, 2006, Japanese Patent Application No. 2004-230382.

* cited by examiner

CONFIGURABLE MAPPING OF DEVICES TO BUS FUNCTIONS

CROSS-REFERENCE TO RELATED APPLICATIONS

This application is a divisional application of commonly-owned U.S. patent application Ser. No. 10/644,291, filed on Aug. 20, 2003, now U.S. Pat. No. 7,003,591, entitled "Configurable Mapping of Devices to Bus Functions".

BACKGROUND

1. Field of the Invention

The present invention relates to communications buses for use in computer systems and, more particularly, to techniques for efficiently configuring multiple devices connected to a communications bus.

2. Related Art

A conventional computer system typically includes a central processing unit (CPU), main memory, and a number of devices that are in communication with each other and the CPU over a data bus, also referred to as an Input/Output (I/O) bus. The CPU, for example, transmits commands and data to the devices (such as hard disk drives, printers, and displays) over the data bus, and vice versa. A variety of conventional data buses exist, such as the Small Computer System Interface (SCSI) bus, the Industry Standard Architecture (ISA) bus, the Peripheral Component Interface (PCI) bus, and the Inter-IC ($I^2C$) bus. A conventional computer system also typically includes a system bus that transports data between the processor and the main memory.

Figure 1:
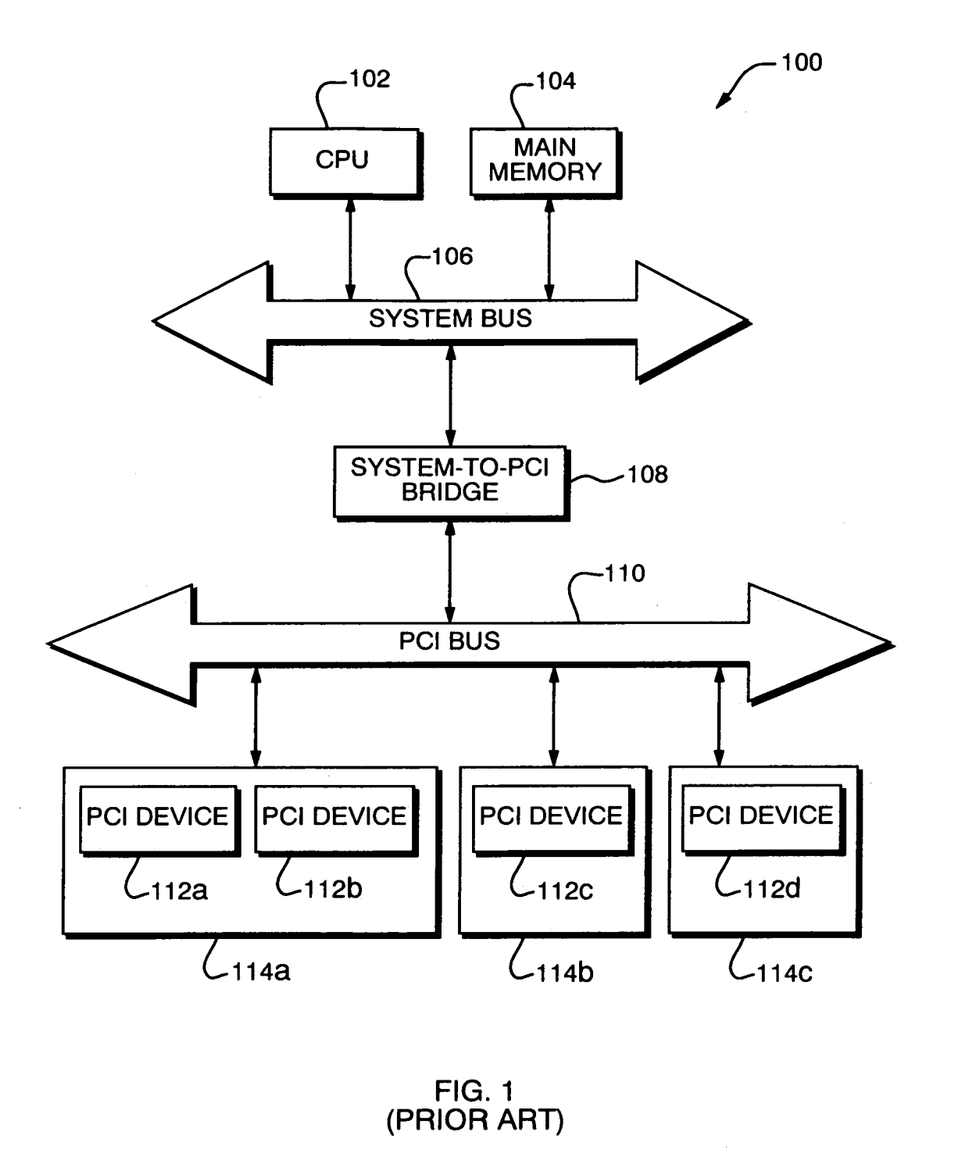
FIG. 1 is a diagram of a prior art computer system including a PCI bus.

Referring to FIG. 1, a block diagram is shown of a prior art computer system 100. The computer system includes a central processing unit (CPU) 102 and main memory 104 (e.g., RAM) coupled to a system bus 106. The system 100 also includes a PCI bus 110, which is coupled to the system bus 106 by a system-to-PCI bridge 108. Four cards 114a-c (also referred to herein as "physical PCI devices") are coupled to the PCI bus 110. As described in more detail below, each of the cards 114a-c may implement one or more "logical" PCI devices. In the example shown in FIG. 1, card 114a implements two logical devices 112a-b, card 114b implements one logical device 112c, and card 114c implements one logical device 112d.

Both logical devices 112a and 112b may, for example, be UARTs (universal asynchronous receiver-transmitters). A UART is a computer component that handles asynchronous serial communication. Every computer contains at least one UART to manage its serial ports, and some internal modems have their own UART. In particular, both devices 112a-b may be implemented using a single processor on the card 114a having the ability to function as two UARTs, or using two separate sets of components on the card 114a.

The CPU 102 and main memory 104 may communicate with each other over the system bus 106, the devices 112a-d may communicate with each other over the PCI bus 110, and the CPU 102 and main memory 104 may communicate with the devices 112a-d through the system bus 106 and PCI bus 110 over the system-to-PCI bridge 108.

The PCI bus 110 provides a "configuration space," currently defined by the PCI Local Bus Specification Revision 2.3, that is used to store configuration information for devices coupled to the bus 110 (e.g., devices 112a-d in the example illustrated in FIG. 1). The configuration space for each PCI device contains configuration information such as a device identifier, vendor identifier, and revision identifier. The configuration information for a particular PCI device typically is stored in an EEPROM on the PCI card and is then loaded into registers from which it may be accessed (e.g., by initialization software and error handling software) to obtain information about the device and to configure the device to function properly in a particular system.

More specifically, referring to FIG. 2, a diagram is shown of an example PCI configuration space 200 is illustrated as a single contiguous set of configuration registers that are allocated to PCI buses and to devices on such buses in a manner that will now be described in more detail.

Each PCI bus within a computer system is allocated a portion of the configuration space 200. In the example shown in FIG. 2, the configuration space 200 is divided into three sub-spaces 202a-c, each of which is allocated to one PCI bus. Each of the bus configuration spaces 202a-c includes 64 K of memory. The system 100 shown in FIG. 1 only includes one PCI bus 110, which would therefore be allocated the first portion 202a of the configuration space 200. The portion 202a is therefore referred to herein as a "bus configuration space."

Figure 2:
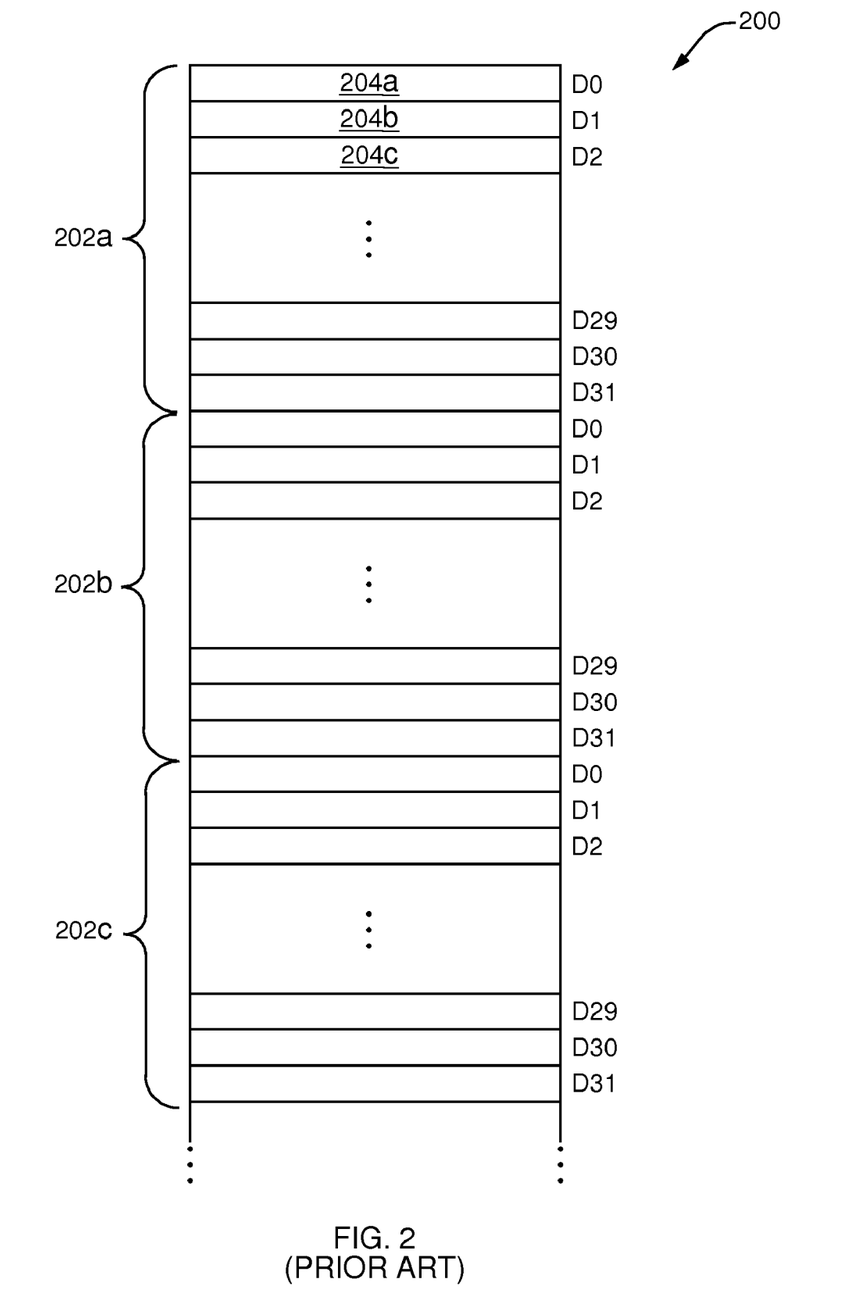
FIG. 2 is a diagram of a prior art PCI configuration space.

As further shown in FIG. 2, each of the bus configuration spaces 202a-c is further subdivided into 32 sub-spaces, each of which is 2 K long and which may be allocated to a separate physical device (e.g., card) on the corresponding PCI bus. Each of these 2 K sub-spaces is therefore referred to herein as a "physical device configuration space." Referring again to FIG. 1, the computer system 100 includes three physical PCI devices 114a-c. PCI device 114a may, for example, be allocated physical device configuration space 204a, PCI device 114b may be allocated physical device configuration space 204b, and PCI device 114c may be allocated physical device configuration space 204c.

The PCI bus architecture allows devices that perform more than one function to be connected to a PCI bus. An example of a device that performs more than one function is a multi-port device, such as a device having two SCSI ports on a single chip. Another example is device 114a, which implements the functionality of two UARTs in logical devices 112a and 112b, respectively. A separate configuration space is allocated to each function (e.g., port or UART) in a multifunction device. More specifically, each physical device configuration space is divided into eight "function configuration spaces," each of which contains configuration registers for a particular function.

Figure 3:
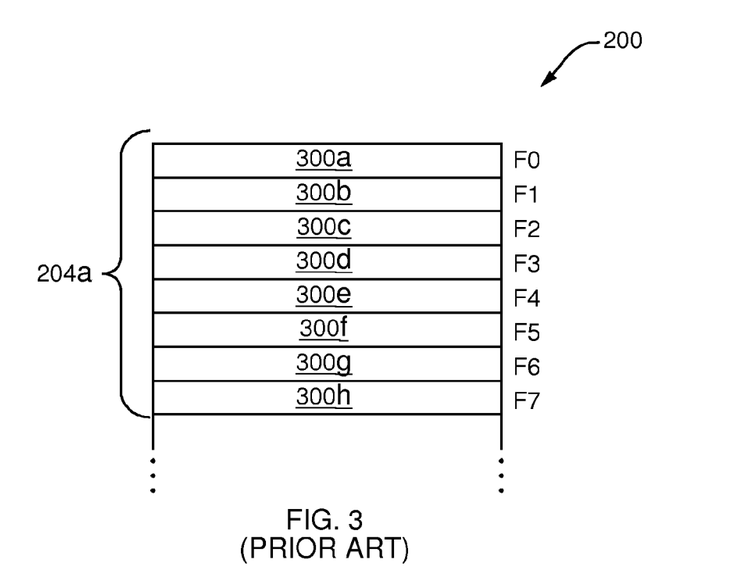
FIG. 3 is a diagram of a prior art PCI physical device configuration space.

For example, referring to FIG. 3, a diagram is shown of the physical device configuration space 204a which, in the present example, is allocated to physical device 114a. The physical device configuration space 204a is subdivided into eight 256-byte "function configuration spaces" 300a-h. Each of the function configuration spaces 300a-h is designed to store configuration information for a distinct function (e.g., port or UART) of the corresponding physical device 114a.

Physical PCI devices are only required to implement a single function. A single-function device may, for example, provide configuration information for its single function in the first of its function configuration spaces, and leave the remaining function configuration spaces that are allocated to it empty. A multi-function device may store configuration information in two or more of its function configuration spaces, up to a maximum of eight functions.

Figure 4:
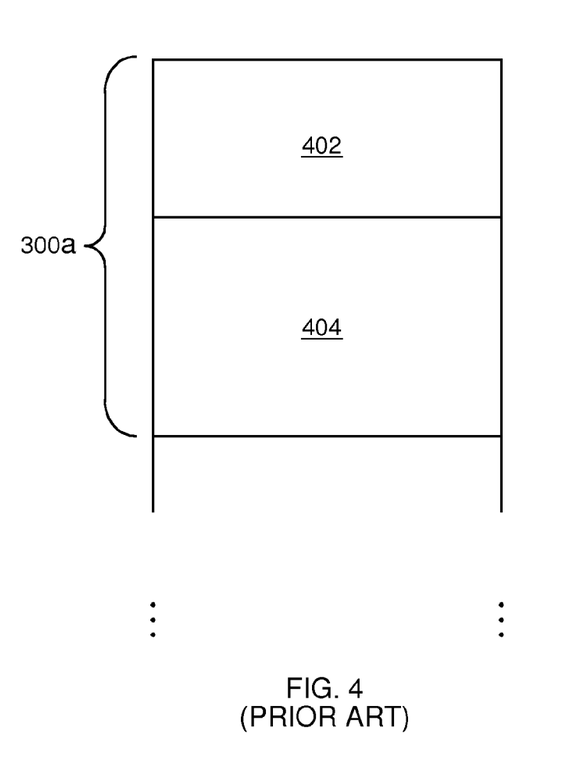
FIG. 4 is a diagram of a prior art PCI function configuration space.

Referring to FIG. 4, the function configuration space 300a (corresponding to function 0 of PCI device 114a in the present example) is shown in more detail. The function configuration space 300a includes both a 64-byte header portion 402 and a 192-byte configuration register portion 404.

Figure 5:
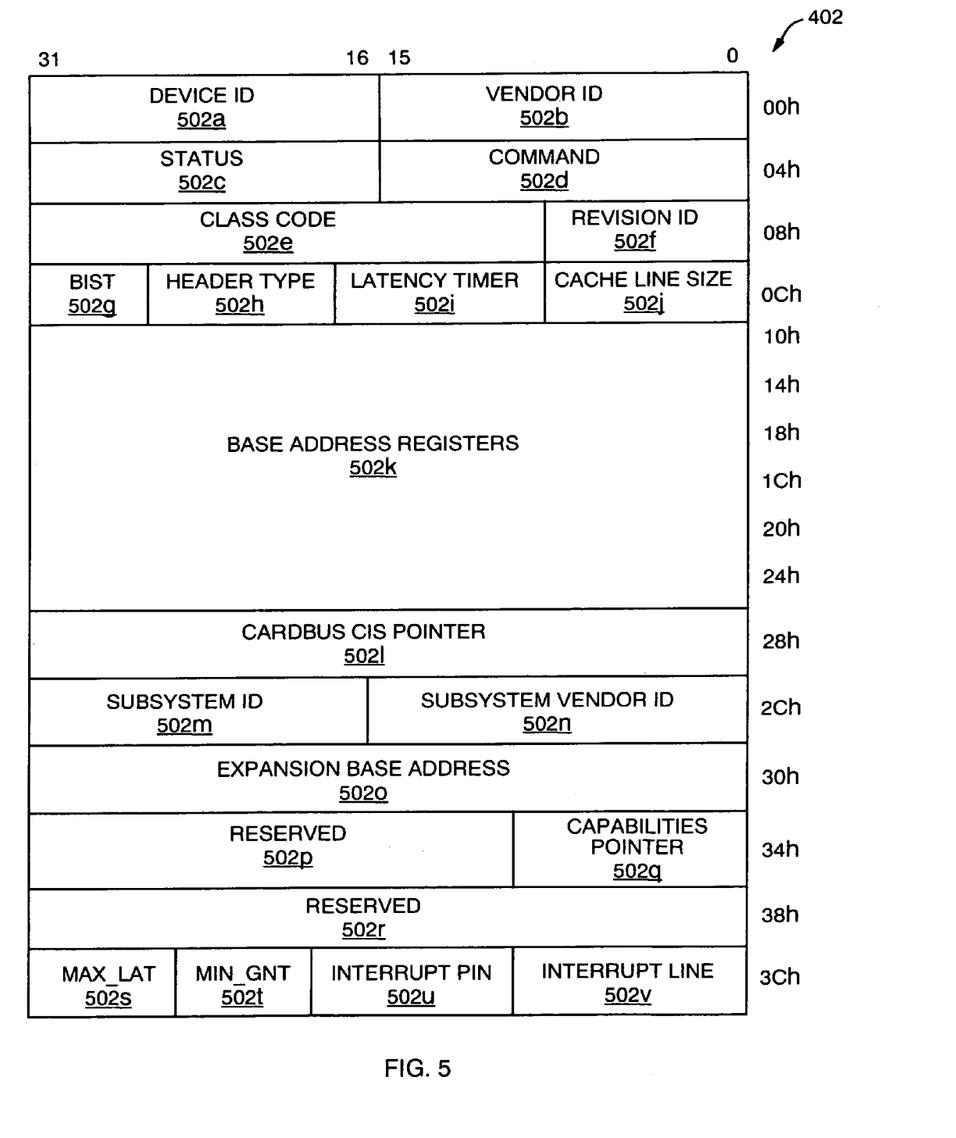
FIG. 5 is a diagram of a prior art PCI function configuration space header.

Referring to FIG. 5, a diagram is shown which illustrates the header portion 402 of function configuration space 300a in more detail. The header portion 402 is illustrated in FIG. 5 as a two-dimensional array that is 32 bits (4 bytes) wide and 16 bytes long. As defined by the PCI specification, header portion 402 includes the following fields: device identifier (ID) 502a, vendor ID 502b, status 502c, command 502d, class code 502e, revision ID 502f, BIST (built-in self test) 502g, header type 502h, latency timer 502i, cache line size 502j, base address registers 502k, CardBus CIS Pointer 502l, subsystem ID 502m, subsystem vendor ID 502n, expansion ROM base address 502o, reserved 502p, capabilities pointer 502q, reserved 502r, Max_Lat 502s, Min_Gnt 502t, interrupt pin 502u, and interrupt line 502v. The fields that are not discussed in detail herein are well-known to those of ordinary skill in the art and are described in more detail in the PCI specification.

Some operating systems, such as HP-UX version 11i and higher, allow multiple logical devices on a single PCI card to be allocated (mapped) to a single PCI function. For example, as mentioned above, the logical devices 112a and 112b in the system 100 (FIG. 1) may be implemented on the single PCI card 114a. Logical devices 112a and 112b may, therefore, be mapped to the single function 300a (FIG. 3) if the system 100 operates using an operating system, such as the HP-UX operating system, which allows mapping of multiple devices to a single PCI function. The ability to map multiple devices (such as UARTs) to a single function makes the use of functions more efficient, because the registers in only one function need be configured and maintained to provide configuration information for two devices.

One way to map multiple devices to a single PCI function is as follows. A special subsystem ID value may be designated by the operating system (e.g., HP-UX) to means that "multiple devices are mapped to this function." This special device ID value will be referred to herein by the label MULT_DEVICES. To map two or more devices (such as devices 112a and 112b) implemented on a single PCI card to a single PCI function in the card's physical device configuration space, the value MULT_DEVICES may be stored in the subsystem ID field 502m (FIG. 5) of the function. The two devices then share the configuration registers 404, with the registers allocated to the two devices being contiguous within the configuration registers 404.

Assume that both devices 112a and 112b have been mapped to the single function 300a, and that both devices 112a and 112b therefore share the single configuration space header 402. Logical devices on a PCI bus are addressed by a combination of bus number, device number (ID), and function number. When a component of the system 100, such as device 112c, attempts to access function 402 by addressing the function at bus zero, device number MULT_DEVICES, and function zero, the operating system will interpret the device number of MULT_DEVICES as a special value which indicates that two devices are mapped to the function being addressed. The operating system is configured to access the configuration registers 404 for the devices 112a-b appropriately in response to this special address.

Other operating systems, such as Microsoft® .NET, however, may not provide the ability to map multiple devices to a single PCI function and may not be able to correctly interpret the meaning of the special subsystem ID value of MULT_DEVICES. If such an operating system is loaded onto the system 100, therefore, the operating system may not recognize and therefore be unable to access the second mapped device (e.g., device 112b).

One way to attempt to solve this problem would be to re-map each of the devices 112a-d to a separate PCI function. After performing this re-mapping, operating systems such as Microsoft® NET would be able to access all of the devices 112a-d correctly. Such a re-mapping might, however, make other operating systems, such as HP-UX, unable to access all of the devices 112a-d correctly. Attempting to solve this problem by modifying one or more of the operating systems themselves would be costly and time-consuming and would require customers to upgrade their operating systems.

What is needed, therefore, are improved techniques for mapping multiple devices to a single PCI function in a multi-operating system computer system.

SUMMARY

Techniques are disclosed for enabling a single computer system to execute both operating systems that permit multiple devices to be mapped to a single PCI function and operating systems that do not permit such mapping. Prior to loading and executing an operating system (e.g., during system reset), the computer system determines whether the operating system supports mapping of multiple devices to a single function. If such mapping is supported, the computer system maps multiple devices on a single PCI card to a single function in the PCI configuration space for the card. If such mapping is not supported, the computer system maps each device to a separate PCI function. The computer system then loads and executes the operating system. The operating system is thereby enabled to access all devices on the bus according to the particular device-function mapping scheme supported by the operating system.

For example, in one aspect of the present invention, a computer-implemented method is provided for use in a computer system comprising a plurality of logical devices coupled to a bus associated with a configuration space including a plurality of functions. The method includes steps of: (A) determining whether a compatibility flag indicates that each of the plurality of logical devices should be mapped to a distinct one of the plurality of functions; (B) mapping each of the plurality of logical devices to a distinct one of the plurality of functions if it is determined in step (A) that the plurality of logical devices should be so mapped; and (C) otherwise, mapping at least two of the plurality of logical devices to a single one of the plurality of functions.

In another aspect of the present invention, a computer-implemented method is provided for use in a computer system including a plurality of physical devices coupled to a Peripheral Component Interconnect (PCI) bus associated with a configuration space-including a plurality of functions. Each of the plurality of physical devices implements at least one of a plurality of logical devices coupled to the PCI bus. The method includes steps of: (A) determining whether a compatibility flag indicates that each of the plurality of logical devices should be mapped to a distinct one of the plurality of functions; (B) if it is determined in step (A) that each of the plurality of logical devices should be mapped to a distinct one of the plurality of functions, then for each physical device. D in the plurality of physical devices, performing steps of: (1) identifying a set S of logical devices implemented by physical device D; and (2) mapping each of the logical devices in set S to a distinct function associated with the physical device D; (C) otherwise, for each physical device D in the plurality of physical devices, performing steps of: (1) identifying a set S of logical devices implemented by physical device D; and (2) mapping all of logical devices in set S to a single function in a portion of the configuration space associated with physical device D by storing a value in a subsystem ID field of a PCI header in the portion of the configuration space, wherein the value indicates that multiple logical devices are mapped to the single function.

In yet another aspect of the present invention, a device is provided for use in a computer system including a plurality of logical devices coupled to a bus associated with a configuration space including a plurality of functions. The device includes determination means for determining whether a compatibility flag indicates that each of the plurality of logical devices should be mapped to a distinct one of the plurality of functions, first mapping means for mapping each of the plurality of logical devices to a distinct one of the plurality of functions if the determination means determines that the plurality of logical devices should be so mapped, and second mapping means for mapping at least two of the plurality of logical devices to a single one of the plurality of functions if the determination means does not determine that each of the plurality of logical devices should be mapped to a distinct one of the plurality of functions.

In yet a further aspect of the present invention, a computer-implemented method is provided for use in a computer system including a plurality of logical devices coupled to a bus associated with a configuration space including a plurality of functions. The method includes steps of: (A) determining whether an operating system selected to be executed in the computer system supports mapping of multiple logical devices to a single function; (B) mapping each of the plurality of logical devices to a distinct one of the plurality of functions if it is determined in step (A) that the operating system selected to be executed in the computer system does not support mapping of multiple logical devices to a single function; and (C) otherwise, mapping at least two of the plurality of logical devices to a single one of the plurality of functions.

In another aspect of the present invention, a computer-implemented method is provided for use in a computer system including a plurality of physical devices coupled to a Peripheral Component Interconnect (PCI) bus associated with a configuration space including a plurality of functions. Each of the plurality of physical devices implements at least one of a plurality of logical devices coupled to the bus. The method includes steps of: (A) determining whether an operating system selected to be executed in the computer system supports mapping of multiple logical devices to a single function; (B) if it is determined in step (A) that the operating system selected to be executed in the computer system does not support mapping of multiple logical devices to a single function, then for each physical device D in the plurality of physical devices, performing steps of: (1) identifying a first set S of logical devices implemented by physical device D; and (2) mapping each of the logical devices in the first set S to a separate function associated with the physical device D; and (C) otherwise, for each physical device D in the plurality of physical devices, performing steps of: (1) identifying a second set S of logical devices implemented by physical device D; and (2) mapping all of the logical devices in the second set S to a single function associated with the physical device D.

In a further aspect of the present invention, a device is provided for use in a computer system including a plurality of logical devices coupled to a bus associated with a configuration space including a plurality of functions. The device includes determination means for determining whether an operating system selected to be executed in the computer system supports mapping of multiple logical devices to a single function, first mapping means for mapping each of the plurality of logical devices to a distinct one of the plurality of functions if the determination means determines that the operating system selected to be executed in the computer system does not support mapping of multiple logical devices to a single function, and second mapping means for mapping at least two of the plurality of logical devices to a single one of the plurality of functions if the determination means determines that the operating system selected to be executed in the computer system supports mapping of multiple logical devices to a single function.

Other features and advantages of various aspects and embodiments of the present invention will become apparent from the following description and from the claims.

DETAILED DESCRIPTION

Techniques are disclosed for enabling a single computer system to execute both operating systems that permit multiple devices to be mapped to a single PCI function and operating systems that do not permit such mapping. Prior to loading and executing an operating system (e.g., during system reset), the computer system determines whether the operating system supports mapping of multiple devices to a single function. If such mapping is supported, the computer system maps multiple devices on a single PCI card to a single function in the PCI configuration space for the card. If such mapping is not supported, the computer system maps each device to a separate PCI function. The computer system then loads and executes the operating system. The operating system is thereby enabled to access all devices on the bus according to the particular device-function mapping scheme supported by the operating system.

Figure 6:
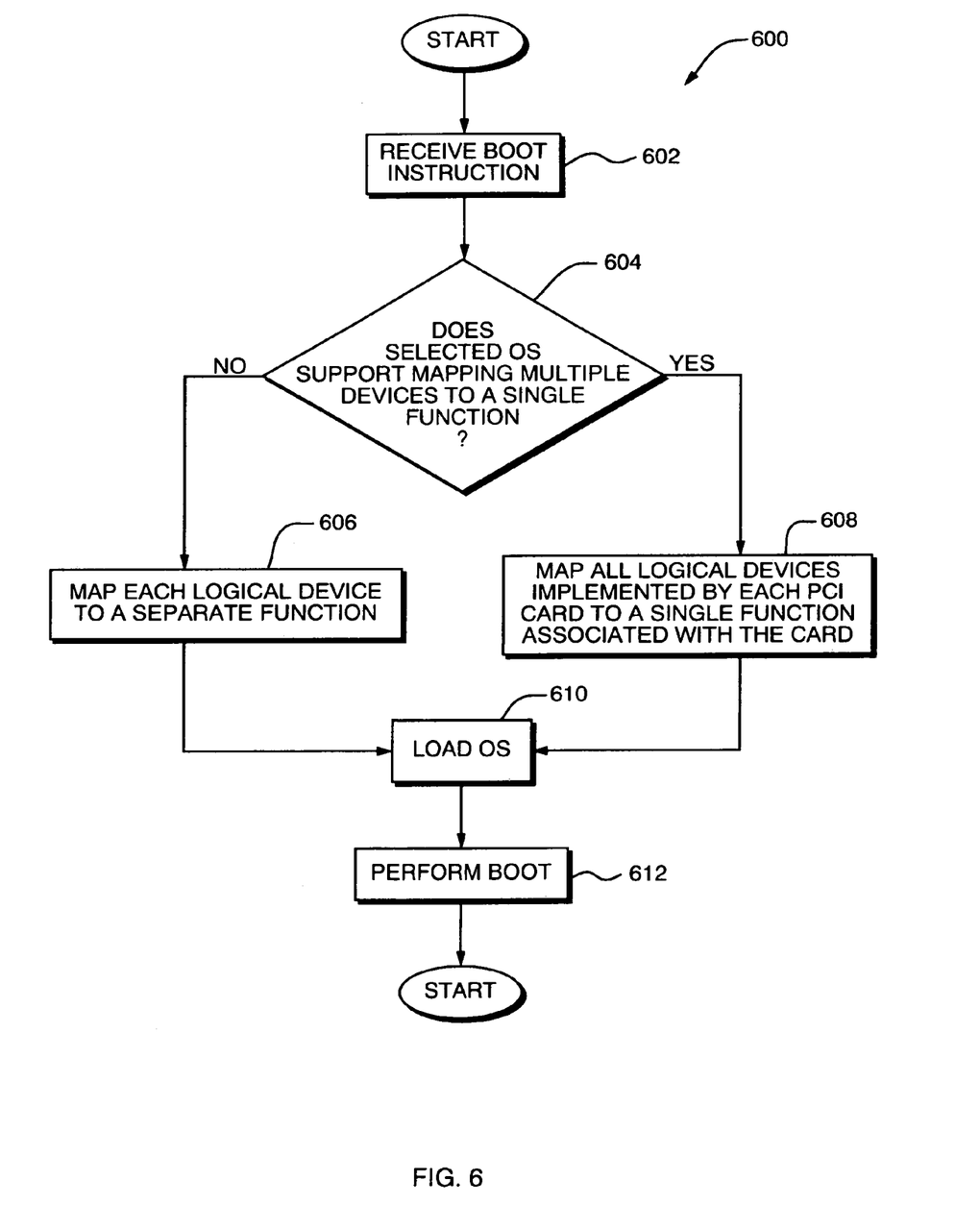
FIG. 6 is a flowchart of a method that is performed in one embodiment of the present invention to map devices to PCI functions in a manner that is compatible with the operating system configured to execute in a computer system.
Figure 7:
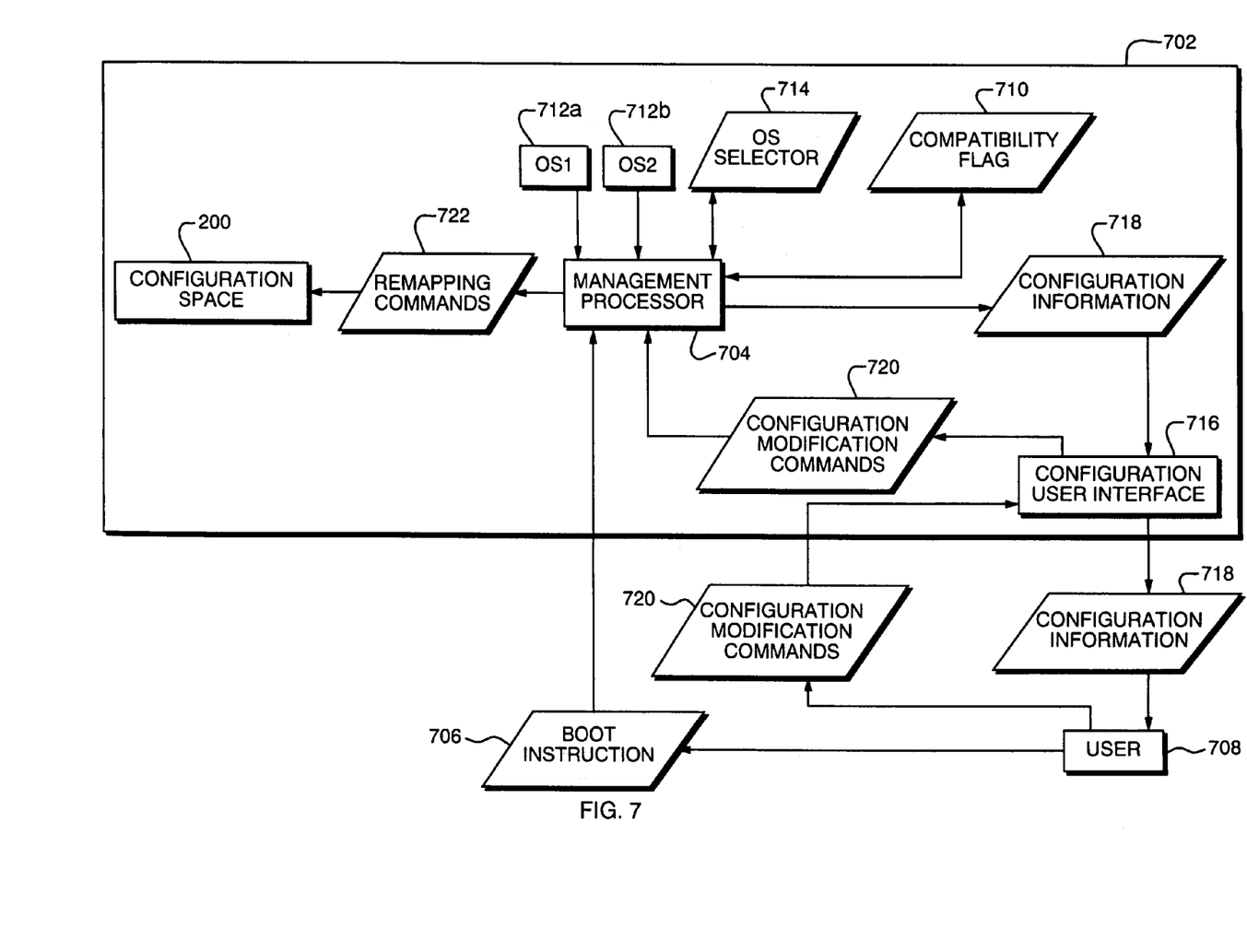
FIG. 7 is a dataflow diagram illustrating the actions performed by the method of FIG. 6 according to one embodiment of the present invention.

Referring to FIG. 6, a flowchart is shown of a method 600 that is performed in one embodiment of the present invention to map devices to PCI functions in a manner that is compatible with the particular operating system that is configured to execute in a computer system. Referring to FIG. 7, a dataflow diagram is shown illustrating the actions performed by the method 600 in a computer system 702.

The method 600 may, for example, be performed by a management processor 704 in computer system 702. A management processor is a processor commonly used in servers to perform system management functions such as booting up the server with an appropriate operating system and configuring the PCI configuration space 200. Although the computer system 702 includes a CPU, memory, a data bus (such as a PCI bus), and other components commonly found in a computer system, only those components that are relevant to the present discussion are illustrated in FIG. 7 for ease of illustration and explanation.

The method 600 receives an instruction 706 to boot the computer system 702 (step 602). The boot instruction 706 may be provided by a user 708 of the system 702 or by another source, such as another computer. The boot instruction 706 may, for example, be an instruction to perform a cold boot, warm boot, or other kind of reset of the computer system 702. The method 600 may also be performed, for example, after unloading the operating system currently executing on the computer system 702.

The computer system 702 includes two operating systems 712a and 712b. For purposes of example, assume in the following discussion that operating system 712a is an operating system (such as HP-UX) that supports mapping multiple devices to a single PCI function, and that operating system 712b is an operating system (such as Microsoft® .NET) that does not support mapping multiple devices to a single PCI function.

The computer system 702 includes an operating system selector 714 that indicates which of the operating systems 712a-b is to be executed on the computer system 702. The computer system 702 includes a compatibility flag 710 which indicates whether multiple devices may be mapped to a single PCI function in the system 702. The compatibility flag 710 may, for example, be set to a value which indicates whether the operating system selected by the operating system selector 714 allows multiple devices to be mapped to a single PCI function. The compatibility flag 710 may, for example, be represented by a single bit, the value of which indicates whether multiple devices may be mapped to a single PCI function.

The management processor 704 may, for example, allow the user to modify the value of the operating system selector 714, the compatibility flag 710, and other configuration information (not shown). Upon powering up the computer system 702, for example, the management processor 704 may present the user 708 with a configuration user interface (UI) 716 which displays the current values of configuration information 718, such as the operating system selector 714 and the compatibility flag 710. The user 708 may provide configuration modification commands 720 to the management processor 704 through the configuration UI 716, thereby instructing the management processor 704 to modify the values of the configuration information 718. When the user 708 selects a particular one of the operating systems 712a-b, the management processor 704 may set the operating system selector 714 to a value representing the selected operating system and set the compatibility flag 710 to a value indicating whether the selected operating system permits multiple devices to be mapped to a single PCI function. The computer system 702 may include a table (not shown) which maps values of the operating system selector 714 to values of the compatibility flag 710. The management processor 704 may use such a table to set the value of the compatibility flag 710 based on the value of the operating system selector 714. Alternatively, the user 708 may set the value of the compatibility flag 710 manuualy through the user interface 716.

The operating system selector 714, compatibility flag 710, and other configuration information may be stored in any kind of non-volatile memory, such as flash RAM.

Returning to FIG. 6, the method 600 determines whether the operating system selected by the operating system selector 714 supports mapping of multiple devices to a single PCI function (step 604). The method 600 may perform step 604 by, for example, examining the value of the compatibility flag 710 and determining whether the compatibility flag 710 indicates that the operating system selected by the operating system selector 714 supports mapping multiple devices to a single PCI function.

If the currently-selected operating system supports mapping of multiple devices to a single PCI function, the method 600 maps each logical device on the PCI bus 110 (e.g., logical devices 112a-d) to a separate function (step 606). If the compatibility flag 710 indicates that multiple devices may be mapped to a single PCI function, then for each PCI card the method 600 maps all logical devices implemented by the card to a single PCI function in the card's configuration space (step 608). The operations performed in steps 606 and 608 are illustrated diagrammatically in FIG. 7 by the remapping commands 722 issued by the management processor 704 to the configuration space 200. The changes that the management processor 704 may make to the configuration space 200 to implement the remapping commands 722 will be described in more detail below with respect to FIGS. 8A-8B.

To understand the operation and effect of steps 606 and 608, consider the following examples. In the first example, the first operating system 712a is selected by the operating system selector 714. Recall that for purposes of example the first operating system 712a supports mapping multiple devices to a single PCI function. Therefore, the compatibility flag 710 indicates that multiple devices may be mapped to a single function in this first example.

In this first example, the method 600 performs step 608, thereby mapping all logical devices within each PCI card to a single PCI function in the card's configuration space. In the example shown in FIG. 1, devices 112a and 112b are implemented in the single PCI card 114a, device 112c is implemented in the second PCI card 114b, and device 112d is implemented in the third PCI card 114c.

Figure 8A:
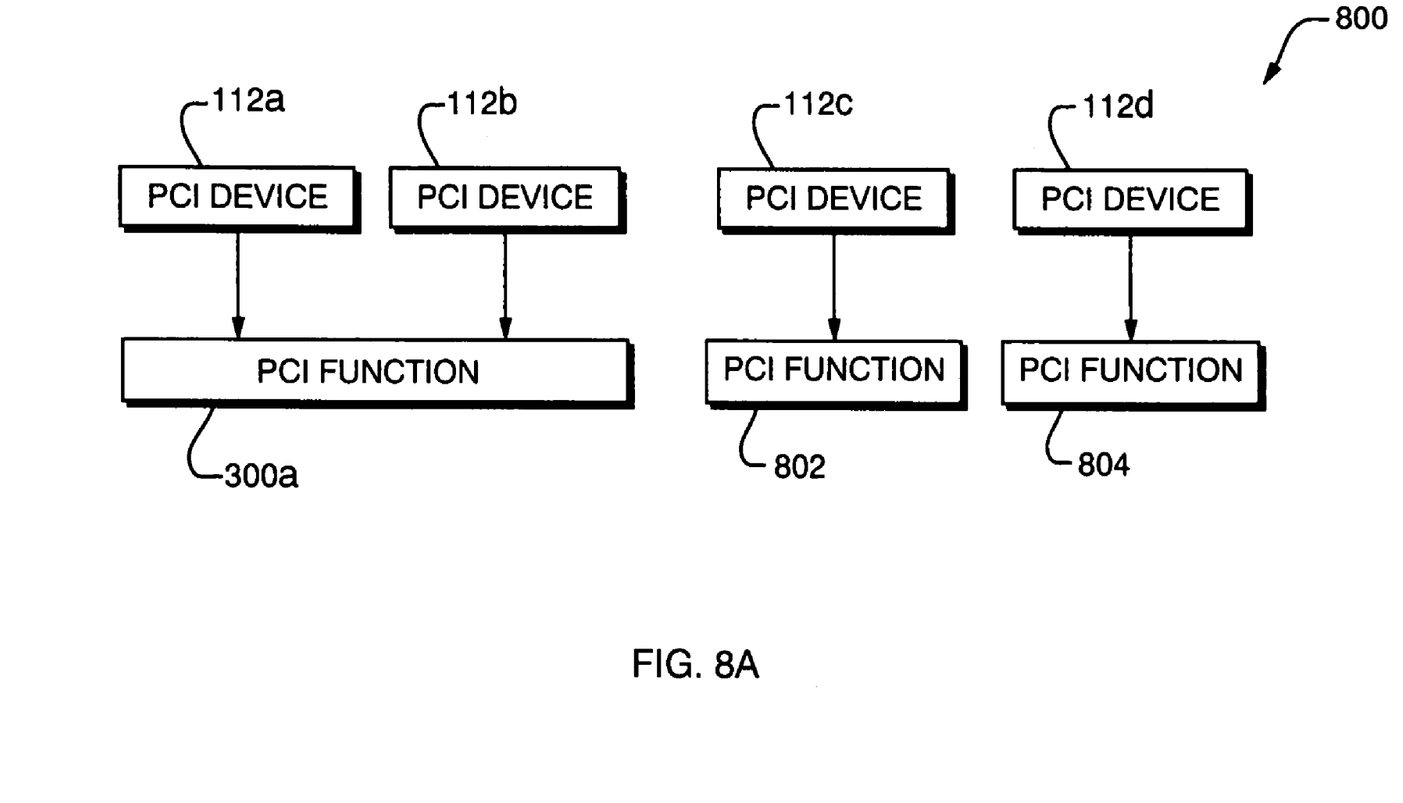
FIG. 8A is a diagram illustrating a first mapping between devices and PCI functions that may result from performance of the method of FIG. 6 according to one embodiment of the present invention.

Referring to FIG. 8A, a diagram is shown which illustrates a mapping 800 that may result from the performance of step 608 in this first example. According to the mapping 800., devices 112a and 112b are both mapped to the single PCI function 300a in physical device configuration space 204a for PCI card 114a. As described above, the devices 112a and 112b may be mapped to the same function 300a by storing a special subsystem ID value (such as MULT_DEVICES) in the subsystem ID field 502m of the function configuration space header 402 for physical device configuration space 204a. In contrast, devices 112c and 112d are mapped to distinct PCI functions 802 and 804, respectively. PCI functions 802 and 804 may, for example, be in physical device configuration spaces 204b and 204c for cards 114b and 114c, respectively.

As described above, operating system 712a does recognize multiple devices that are mapped to a single PCI function. Performing step 608 and thereby mapping devices 112a-d to functions 300a, 802, and 804 in the manner shown in FIG. 8A thereby enables operating system 712a to access all of the devices 112a-d on the PCI bus 110.

In the second example, the second operating system 712b is selected by the operating system selector 714. Recall that for purposes of example the second operating system 712b does not support mapping multiple devices to a single PCI function. Therefore, the compatibility flag 710 indicates that multiple devices may not be mapped to a single function in this second example.

Figure 8B:
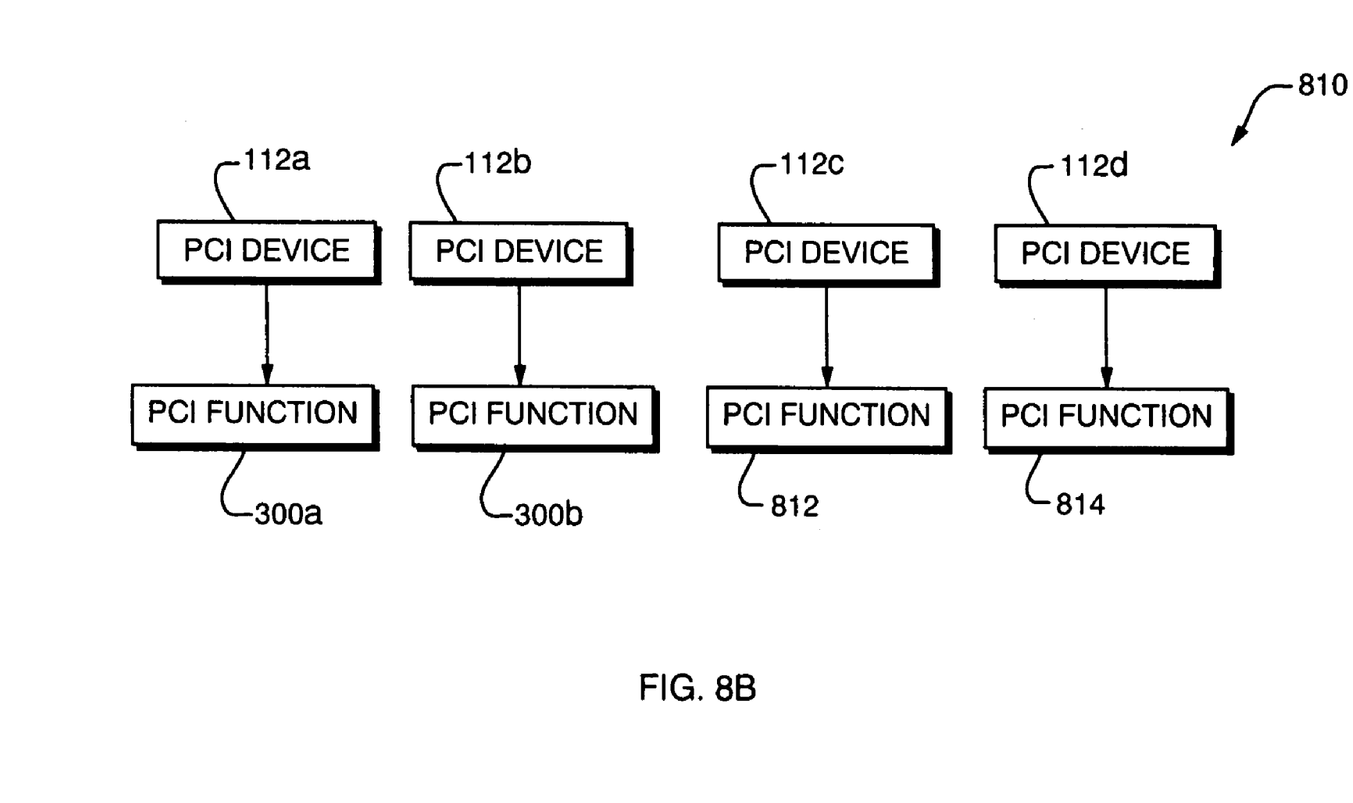
FIG. 8B is a diagram illustrating a second mapping between devices and PCI functions that may result from performance of the method of FIG. 6 according to one embodiment of the present invention.

In this second example, the method 600 performs step 606, thereby mapping each logical device on the PCI bus 110 to a separate-PCI function. Referring to FIG. 8B, a diagram is shown which illustrates a mapping 810 that may result from the performance of step 606 in this second example. According to the mapping 810, devices 112a and 112b are mapped to separate PCI functions 300a and 300b, respectively, in the physical device configuration space 204a for card 114a (FIG. 3). Devices 112c and 112d, in contrast, are mapped to distinct PCI functions 802 and 804 in distinct physical device configuration spaces. 204b-c for cards 114b-c, respectively. As a result, each of the devices 112a-d is mapped to its own function configuration space.

As described above, operating system 712b does not recognize multiple devices that are mapped to a single PCI function. Performing step 606 and thereby mapping each of the devices. 112a-d to a distinct PCI function thereby enables operating system 712b to access all of the devices 112a-d on the PCI bus 110.

After performing either step 606 or 608, the method 600 loads the operating system selected by the operating system selector 714 into the computer system 702 (step 610) and boots the computer system 702 with the loaded operating system (step 612). Techniques for performing steps 610 and 612 are well-known to those of ordinary skill in the art. Although the management processor 704 is shown as loading the selected operating system in FIG. 7, this and other functions performed by the method 60.0 may be performed by other components, such as firmware (e.g., BIOS) running on the system processor (not shown). Upon completion of the boot process, the devices 112a-d on the PCI bus 110 may be accessed by each other and by other components of the computer system 702 using the operating system executing in the computer system 702.

Among the advantages of the invention are one or more of the following.

One advantage of the techniques disclosed herein is that they may be used to enable PCI devices to be mapped to PCI functions in a manner that is compatible with the operating system that is currently executing on a computer system. More specifically, the techniques disclosed herein may be used to map multiple PCI devices to a single PCI function when the current operating system supports such mappings, and to map each PCI device to a distinct PCI function when the current operating system requires such mappings. In this way, both kinds of operating system will be able to locate and use all of the devices connected to the PCI bus.

A related advantage of the techniques disclosed herein is that they may be implemented without requiring that existing operating systems, such as various versions of HP-UX and Microsoft® .NET, be modified. This is advantageous because modifying an operating system is a time-consuming and expensive process for the operating system developer, and because upgrading an operating system is a time-consuming and expensive process for the customer. It is therefore desirable to avoid solutions which require operating system modification, and the techniques disclosed herein provide a solution which does not require operating system modification.

Furthermore, the techniques disclosed herein enable the flexible selection by the user of a particular operating system to execute on the computer system. In many environments it is desirable to have multiple operating systems loaded on a computer and to enable the user to switch between operating systems for various reasons. The techniques disclosed herein allow such switching to occur between operating systems that differ from each other in the manner in which they handle the mapping of devices to PCI functions, thereby maintaining the general flexibility that multi-OS computer systems provide.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Elements and components described herein may be further divided into additional components or joined together to form fewer components for performing the same functions. For example, the functions performed by the management processor 704 may alternatively be performed by two or more processors or other components of the computer system 702.

Although various embodiments of the present invention are described above in conjunction with the PCI bus architecture, the present invention is not limited to use with the PCI bus architecture. Rather, the techniques disclosed herein may be used in conjunction with other bus architectures. Furthermore, although UARTs are described above as examples of devices that may be connected to a bus, the present invention is not limited to use in conjunction with UARTs. Rather, the techniques disclosed herein may be used in conjunction with any bus-connected device.

Although HP-UX and NET are provided above as examples of operating systems that may be used in conjunction with various embodiments of the present invention, the present invention is not limited to use in conjunction with these operating systems. Furthermore, although two operating systems 712a-b are shown in FIG. 7, the techniques disclosed herein may be used in computer systems having fewer or greater than two operating systems.

Although the subsystem ID field 502m is used in the examples above to indicate that a particular function is mapped to multiple devices, this is merely an example. Other fields in the header 402 or other data structures may be used to perform the same function.

It is not required that all devices on a particular PCI card be mapped to a single PCI function. Devices in a PCI card may, for example, be mapped to PCI functions in groups of two or in any other manner.

A single "physical device" may implement one or more "logical devices" as those terms are used herein. A single logical device may be implemented in hardware, software, firmware, or any combination thereof. Although multiple logical devices on a single card may be implemented using a single set of hardware, multiple logical devices on a single card may also be implemented using separate hardware. One example of a logical device is any entity that may be mapped to a PCI function. A logical device is "coupled to" a bus when the physical device that implements the logical device is coupled to the bus.

The techniques described above may be implemented, for example, in hardware, software, firmware, or any combination thereof. The techniques described above may be implemented in one or more computer programs executing on a programmable computer including a processor (such as the management processor 704), a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer-program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method for use in a computer system comprising a plurality of logical devices coupled to a bus associated with a configuration space including a plurality of functions, the method comprising steps of:
   (A) determining whether a compatibility flag indicates that each of the plurality of logical devices should be mapped to a distinct one of the plurality of functions;
   (B) mapping each of the plurality of logical devices to a distinct one of the plurality of functions if it is determined in step (A) that the plurality of logical devices should be so mapped; and
   (C) otherwise, mapping at least two of the plurality of logical devices to a single one of the plurality of functions.

2. The method of claim 1, wherein the bus comprises a Peripheral Component Interconnect (PCI) bus.

3. The method of claim 2, wherein the step (C) comprises a step of storing a value in a field of a PCI header associated with the single one of the plurality of functions in the configuration space, wherein the value indicates that multiple logical devices are mapped to the single one of the plurality of functions.

4. The method of claim 3, wherein the field comprises the subsystem ID field of the PCI header.

5. The method of claim 1, wherein the computer system further comprises a plurality of physical devices coupled to the bus, wherein each of the plurality of physical devices implements at least one of the plurality of logical devices, and wherein the step (C) comprises a step of:
   (C)(1) for each physical device D in the plurality of physical devices:
      (a) identifying a set S of logical devices implemented by physical device D; and
      (b) mapping all of the logical devices in set S to an individual function associated with the physical device D.

6. The method of claim 1, wherein the computer system further comprises a plurality of physical devices coupled to the bus, wherein each of the plurality of physical devices implements at least one of the plurality of logical devices, and wherein the step (B) comprises a step of:
   (B)(1) for each physical device D in the plurality of physical devices:
      (a) identifying a set S of logical devices implemented by physical device D; and
      (b) mapping the logical devices in set S to functions associated with the physical device D, wherein no one of the functions associated with the physical device D is mapped to more than one of the logical devices in set S.

7. A computer-implemented method for use in a computer system including a plurality of physical devices coupled to a Peripheral Component Interconnect (PCI) bus associated with a configuration space including a plurality of functions, each of the plurality of physical devices implementing at least one of a plurality of logical devices coupled to the PCI bus, the method comprising steps of:
   (A) determining whether a compatibility flag indicates that each of the plurality of logical devices should be mapped to a distinct one of the plurality of functions;
   (B) if it is determined in step (A) that each of the plurality of logical devices should be mapped to a distinct one of the plurality of functions, then for each physical device D in the plurality of physical devices, performing steps of:
      (1) identifying a set S of logical devices implemented by physical device D; and
      (2) mapping the logical devices in set S to functions associated with the physical device D, wherein no one of the functions associated with the physical device D is mapped to more than one of the logical devices in set S;
   (C) otherwise, for each physical device D in the plurality of physical devices, performing steps of:
      (1) identifying a set S of logical devices implemented by physical device D; and
      (2) mapping all of logical devices in set S to an individual function in a portion of the configuration space associated with physical device D by storing a value in a subsystem ID field of a PCI header in the portion of the configuration space, wherein the value indicates that multiple logical devices are mapped to the individual function.

8. A device for use in a computer system including a plurality of logical devices coupled to a bus associated with a configuration space including a plurality of functions, the device comprising:
   determination means for determining whether a compatibility flag indicates that each of the plurality of logical devices should be mapped to a distinct one of the plurality of functions;
   first mapping means for mapping each of the plurality of logical devices to a distinct one of the plurality of functions if the determination means determines that the plurality of logical devices should be so mapped; and
   second mapping means for mapping at least two of the plurality of logical devices to a single one of the plurality of functions if the determination means does not determine that each of the plurality of logical devices should be mapped to a distinct one of the plurality of functions.

9. The device of claim 8, wherein the bus comprises a Peripheral Component Interconnect (PCI) bus.

10. The device of claim 9, wherein the second mapping means comprises means for storing a value in a field of a PCI header associated with the single one of the plurality of functions in the configuration space, wherein the value indicates that multiple logical devices are mapped to the single one of the plurality of functions.

11. The device of claim 10, wherein the field comprises the subsystem ID field of the PCI header.

12. The device of claim 8, wherein the computer system further comprises a plurality of physical devices coupled to the bus, wherein each of the plurality of physical devices implements at least one of the plurality of logical devices, and wherein the second mapping means comprises means for:

(1) identifying, for each physical device D in the plurality of physical devices, a set S of logical devices implemented by physical device D; and (2) mapping all of the logical devices in set S to an individual function associated with the physical device D.

13. The device of claim 8, wherein the computer system further comprises a plurality of physical devices coupled to the bus, wherein each of the plurality of physical devices implements at least one of the plurality of logical devices, and wherein the first mapping means comprises means for:

(1) identifying, for each physical device D in the plurality of physical devices, a set S of logical devices implemented by physical device D; and (2) mapping each of the logical devices in set S to an individual function associated with the physical device D.

* * * * *